United States Patent
Nai et al.

(10) Patent No.: US 6,868,356 B2
(45) Date of Patent: Mar. 15, 2005

(54) METHOD OF AND APPARATUS FOR CORRECTION OF COORDINATE MEASUREMENT ERRORS DUE TO VIBRATIONS IN COORDINATE MEASURING MACHINES (CMMS)

(75) Inventors: Kenneth Cheng-Hoe Nai, Edinburgh (GB); David Allan Wright, Edinburgh (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

(21) Appl. No.: 10/069,753

(22) PCT Filed: Jul. 4, 2001

(86) PCT No.: PCT/GB01/03026
§ 371 (c)(1),
(2), (4) Date: Feb. 28, 2002

(87) PCT Pub. No.: WO02/04883
PCT Pub. Date: Jan. 17, 2002

(65) Prior Publication Data
US 2003/0079358 A1 May 1, 2003

(30) Foreign Application Priority Data
Jul. 6, 2000 (GB) .............................................. 0016533

(51) Int. Cl.$^7$ .......................... G01B 21/04; G01P 15/00
(52) U.S. Cl. ......................... 702/95; 702/150; 700/188; 73/865.9; 33/502

(58) Field of Search ............................... 73/865.9, 1.38, 73/1.79, 1.81; 700/188; 33/502, 503, 504, 549, 703, 702; 702/95, 41, 150, 153, 1

(56) References Cited

U.S. PATENT DOCUMENTS

| | | | |
|---|---|---|---|
| 4,333,238 A | | 6/1982 | McMurtry |
| 5,579,246 A | | 11/1996 | Ebersbach et al. ............. 702/95 |
| 5,594,668 A | | 1/1997 | Bernhardt et al. ............. 702/95 |
| 5,610,846 A | * | 3/1997 | Trapet et al. .................. 702/95 |
| 5,778,549 A | | 7/1998 | Campanile .................. 702/153 |
| 6,105,445 A | * | 8/2000 | Campanile ................. 73/865.9 |
| 6,412,329 B1 | * | 7/2002 | Nai ............................ 73/1.79 |
| 6,421,627 B1 | * | 7/2002 | Ericsson ..................... 702/150 |

FOREIGN PATENT DOCUMENTS

| EP | 0974882 | * | 7/1999 |
|---|---|---|---|

* cited by examiner

Primary Examiner—Kamini Shah
(74) Attorney, Agent, or Firm—Oliff & Berridge PLC (57) ABSTRACT

Accelerations of a probe or probe head due to vibrations of a machine during a measuring operation are measured using accelerometers placed in the probe or probe head. The acceleration signals are double integrated to determine the corresponding displacements of the probe or probe head and these are added to the readings of displacement of the machine taken from the machine scales using a data fusion algorithm to correct the scale readings for the vibration of the probe. Both linear and angular accelerations of the probe can be corrected in this way.

20 Claims, 14 Drawing Sheets

METHOD OF AND APPARATUS FOR CORRECTION OF COORDINATE MEASUREMENT ERRORS DUE TO VIBRATIONS IN COORDINATE MEASURING MACHINES (CMMS)

BACKGROUND OF THE INVENTION

1. Field of Invention

The present invention relates to the correction of coordinate measuring errors in CMMs due to vibrations of the component parts thereof.

2. Description of the Related Art

U.S. Pat. Nos. 5,594,668 & 5,610,846, both assigned to Carl-Zeiss of Germany describe methods that use machine acceleration information with the aid of correction tables to determine the amount of displacement of the probe head due mainly to probing force.

In accordance with the description in these patents, the acceleration information in the three translation directions is obtained by double differentiating scale information. This gives the acceleration of the CMM at the measurement scales and not at the probe head.

Also in the methods described in the above-mentioned patents, a correction table containing prior knowledge of the bending behaviour of a particular CMM due to various accelerations and velocities at various positions is used to provide a correction to measurements obtained from the scales.

Another U.S. Pat. No. 5,579,246 assigned to Carl-Zeiss of Germany describes a method that has a similar goal, that is improving measurement accuracy with the aid of accelerometers located near or in the probe head. However the technique described requires a mathematical model describing the dynamic behaviour of the CMM within its measurement volume. Information gathered from the accelerometers are used as input to the model, the model then produces an estimate of the structural vibration, and thus the displacement of the probe head from its nominal axis.

BRIEF DESCRIPTION OF DRAWINGS

Various exemplary embodiments will be described in detailed with references to the following figures, wherein:

FIG. 1 A is a graph illustrating an exemplary frequency response at a probe head;

FIG. 1 C is a diagram illustrating an exemplary probe head misaligning an axis system of three orthogonal accelerometers with that of a CMM axis system due to rotational distortion;

DETAILED DESCRIPTION OF PREFERRED EMBODIMENTS

Theoretical Background

Figure 1A:
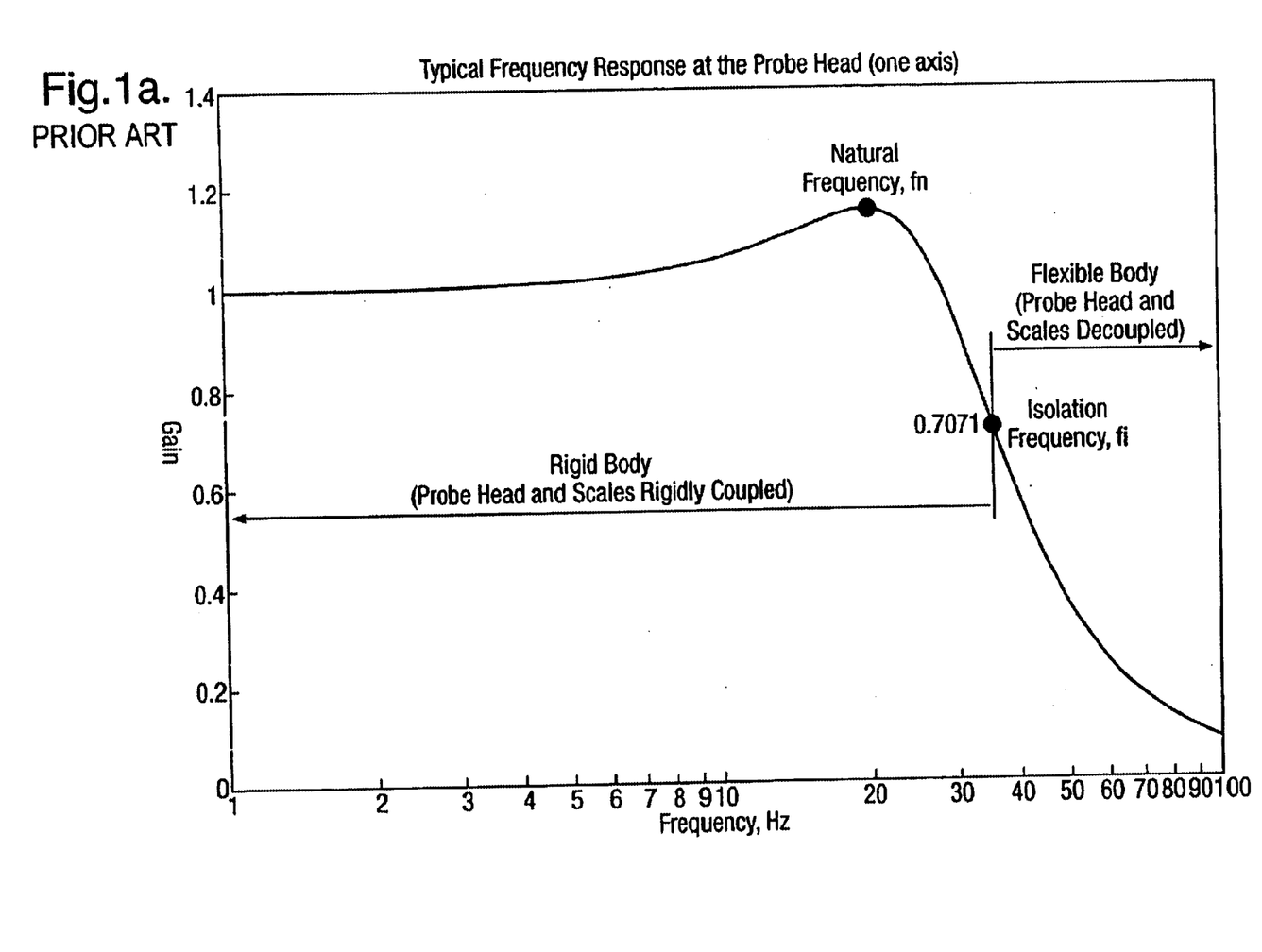

The dynamic response of the probe head mounted on a CMM with a flexible structure will exhibit a typical behaviour frequency response as shown in FIG. 1$a$, this is an ideal frequency response of displacement between the probe head and the measurement scales. The values and shape of this frequency response is unique to a particular axis of a particular CMM. Frequency response identification is normally carried out as part of a CMM installation procedure to aid in "tuning" the servo system, and there are many common and well established methods for performing frequency response identification. The frequency response of the probe head in a particular axis can be obtained by performing a frequency response identification between the probe head velocity (measured using accelerometers) and velocity obtained from the measurement scale for that axis, this will show the frequency region where the probe head is rigidly coupled to the scale.

Correcting Translational Measurement Errors

Figure 1B:
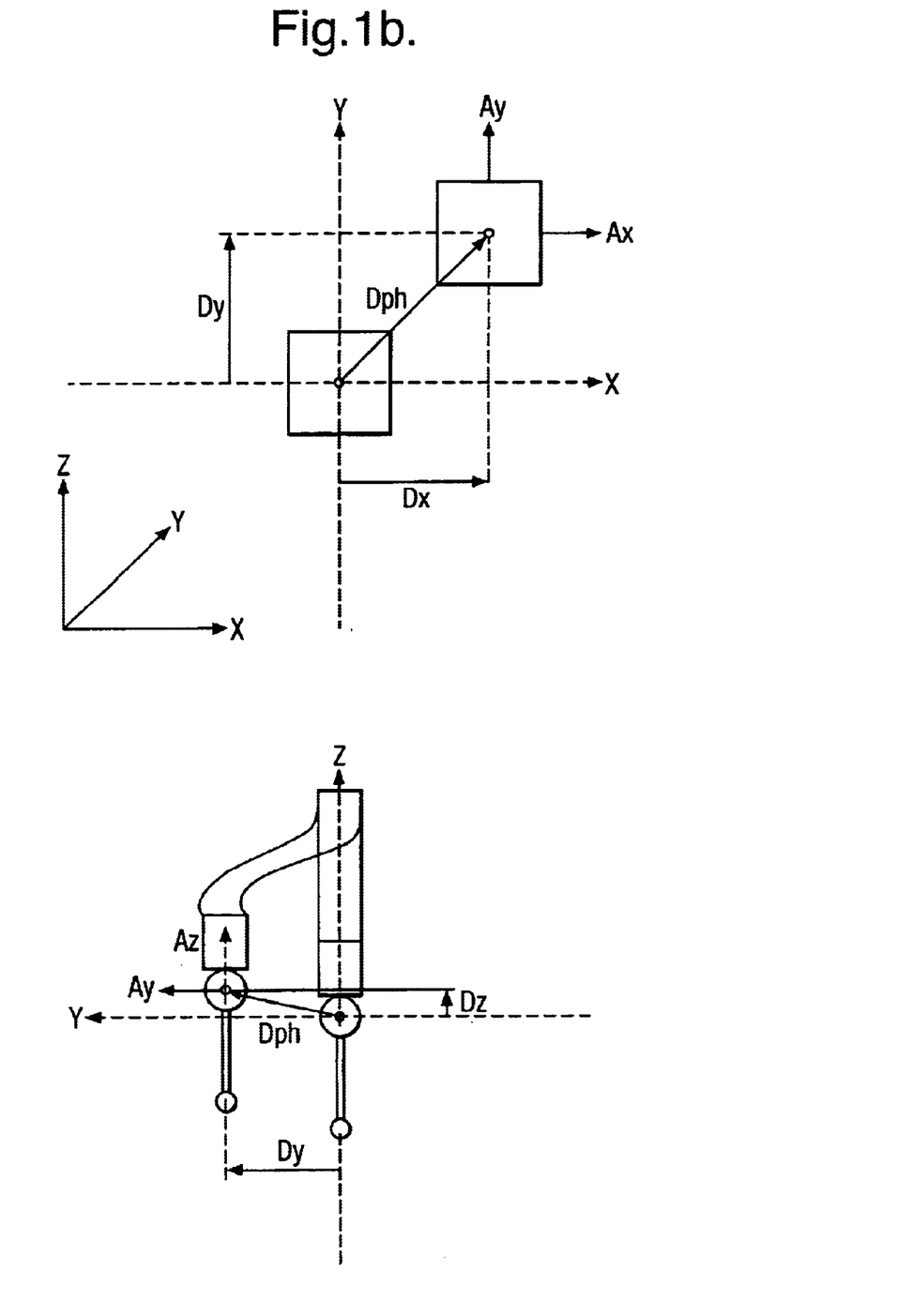
FIG. 1B is a diagram illustrating an exemplary probe head mounted on a coordinate measuring machine.

FIG. 1$b$ shows an example with a probe head mounted on a CMM with a vertical column. It is assumed that acceleration forces in the 3 orthogonal axes will cause the probe head to displace from it nominal centre. Accelerometers positioned in this axis system will detect probe head motion in the x, y & z axis accordingly. In the context of this example, an acceleration force vector with x, y and z axis components acting on the probe head will cause the CMM's flexible structure to distort. The acceleration forces (Ax, Ay, Az) acting on the probe head will cause a displacement (Dx, Dy, Dz) from its nominal centre, this displacement is described as a displacement vector, Dph. The instantaneous value of the displacement vector (Dph) is deduced from accelerometers configured to sense motion in the three orthogonal axes, and for the purpose of this illustration, the accelerometers are placed at the centre of the probe head. The positional relationship between the probe tip and the centre of the probe head remains the same.

The displacement vector (Dph) is then used in association with linear scale information to estimate the position of the probe head in the presence of dynamic forces distorting the structure of the CMM.

Correcting Translational and Rotational Errors

Figure 1C:
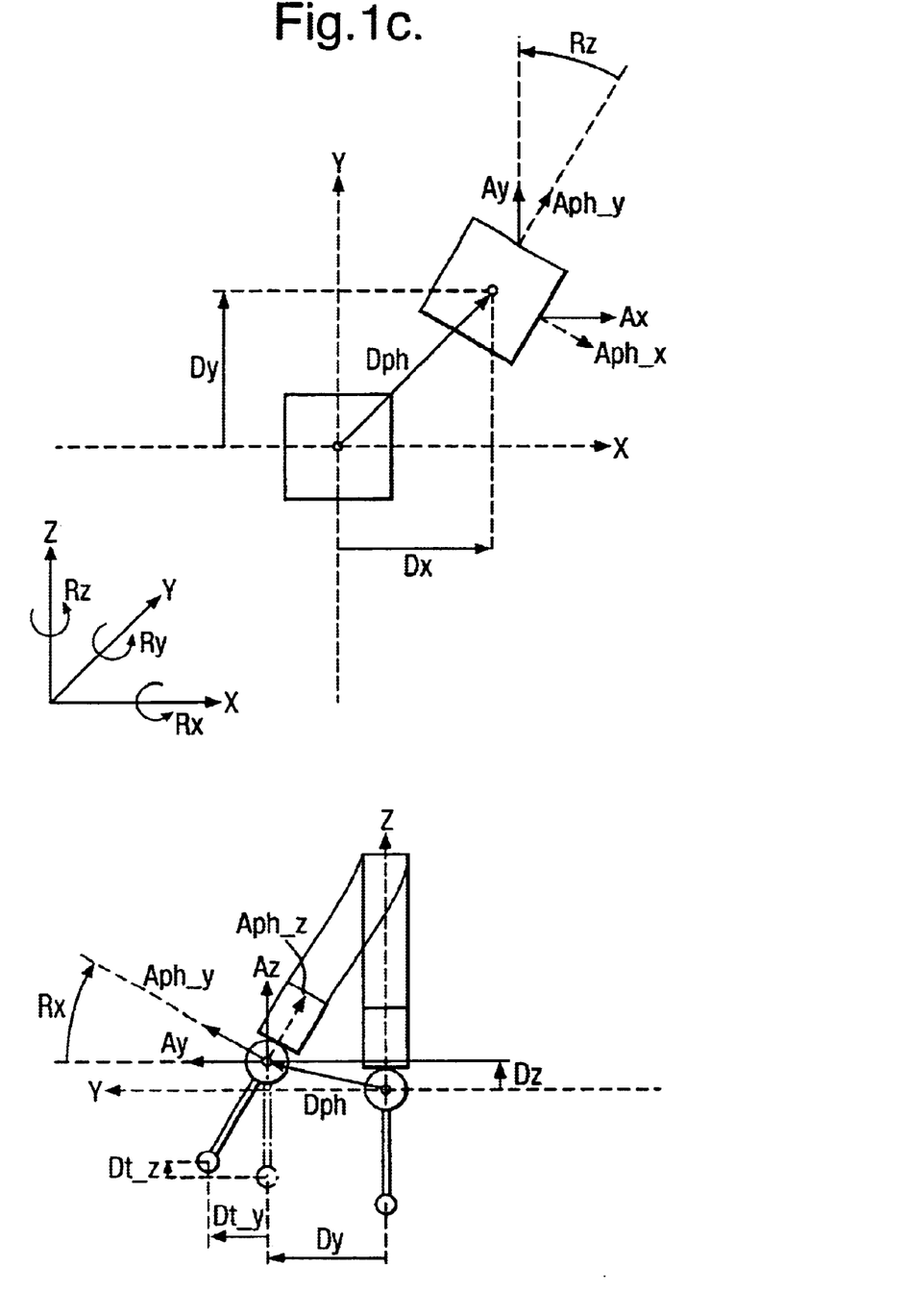

Angular displacement about the 3 orthogonal axes is sensed using angular acceleration sensors. As shown in FIG. 1$c$, a rotational distortion at the probe head will misalign the axis system of the 3 orthogonal accelerometers with that of the CMM's axis system. The accelerometers are now measuring acceleration components Aph_x, Aph_y and Aph_z instead of Ax, Ay and Az. Angular acceleration about the 3 orthogonal axes (Rx, Ry, Rz) is sensed using either gyroscopes or angular accelerometers, this information is than used to calculate a direction matrix (C). The direction matrix describes the orientation of the linear accelerometers axes (Aph_x, Aph_y, Aph_z) to that of the CMM axes (Ax, Ay, Az), in other words, the direction the linear accelerometers in the probe head are pointing with respect to the CMM axes. The direction matrix is used to calculate the acceleration components in the CMM axis system (Ax, Ay and Az), the probe head displacement vector (Dph) is then deduced from Ax, Ay and Az. The positional relationship between the probe tip and probe centre is no longer the same, due to rotation about the orthogonal axes. The probe tip is displaced by Dt_x, Dt_y and Dt_z with respect to the centre of the probe head. The instantaneous displacement of the probe tip from its nominal position (Dt_x, Dt_y, Dt_z) is calculated from the measured angular rotation and the known distance between the probe tip and the origin of the accelerometer axes. The estimated position of the probe tip in CMM coordinates is calculated from combining signals from the linear scales, probe head displacement (Dx, Dy, Dz) information, and probe tip displacement (Dt_x, Dt_y, Dt_z) information.

Rotational displacement at the probe head can also be determined without the use of angular acceleration sensing. Such a method involves calculating angular acceleration using translational acceleration information, for example, rotational acceleration about the x-axis (Rx) is deduced by calculating the arctangent of Aph_z over Aph_y. Rotational displacement is obtained by integrating twice over time. This is a less accurate method, and can be used in systems where rotations without translations are not expected.

Correcting Rotational Distortion due to a Motorised Servo Positioning Head

Measurement errors can also be introduced by rotational torques generated by a motorised probe head. One example is the reaction torque generated by a motorised servo positioning probe head which is itself in motion and taking measurements at the same instance. In such a situation, the probe head can be dynamically distorted from its nominal position due to the torsional bending of the CMM since torque generated by a motorised head is taken back-to-earth through the CMM structure. The process described under the heading "Correcting Translational and Rotational Errors" will measure the amount of angular displacement at the probe head and so correct the measurements obtained from a motorised probe head's rotary encoder system.

Accelerometers Configuration

Figure 2A:
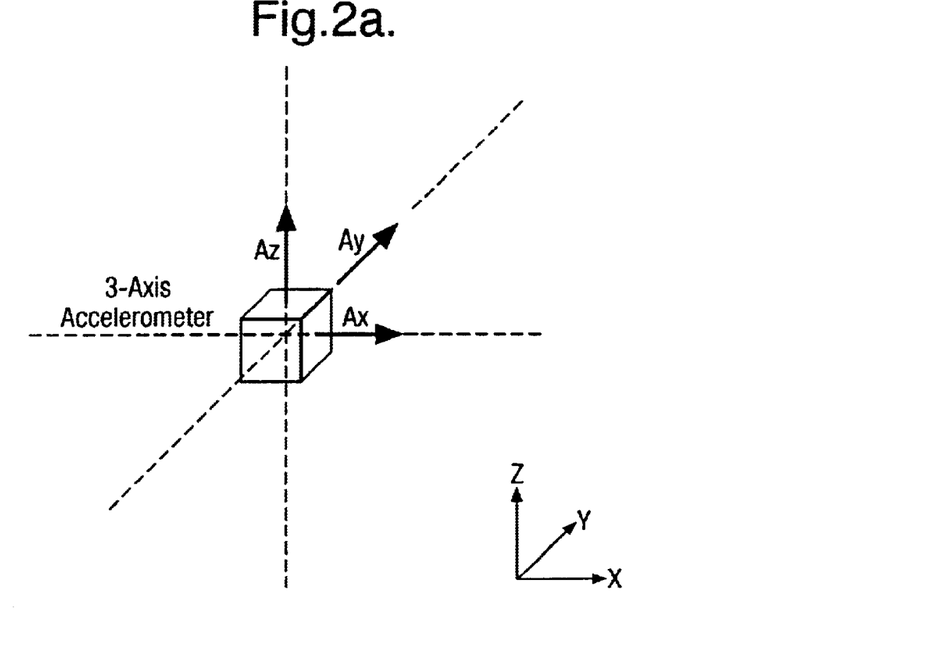
FIGS. 2A–2E are diagrams illustrating various exemplary accelerometer configurations.
Figure 2B:
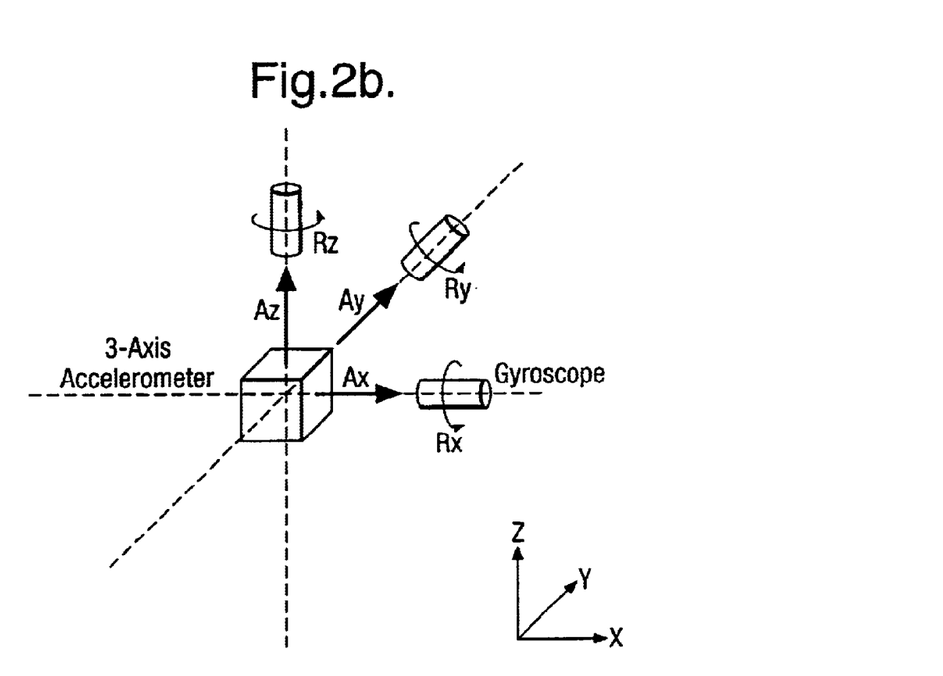
Figure 2C:
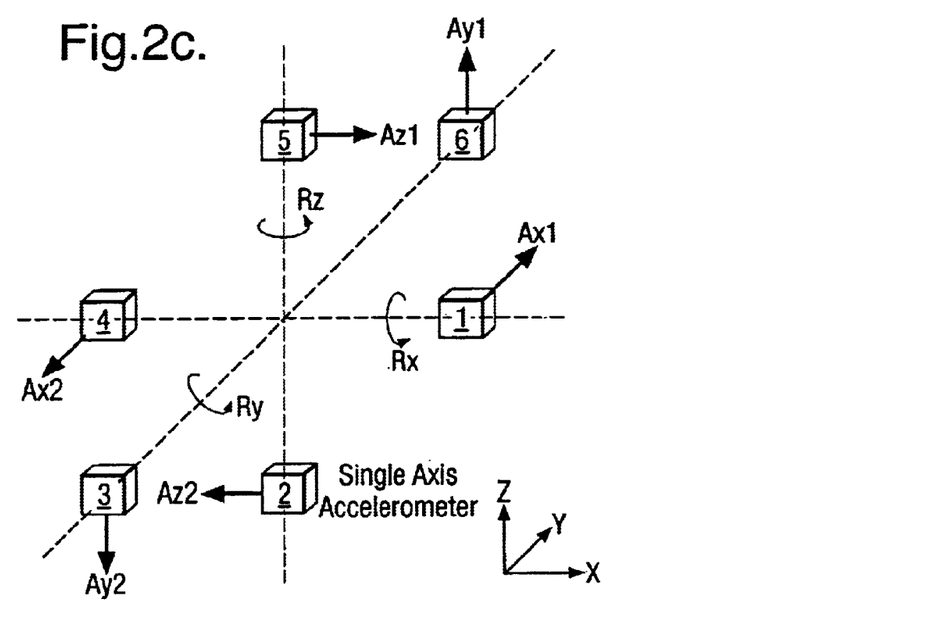
Figure 2D:
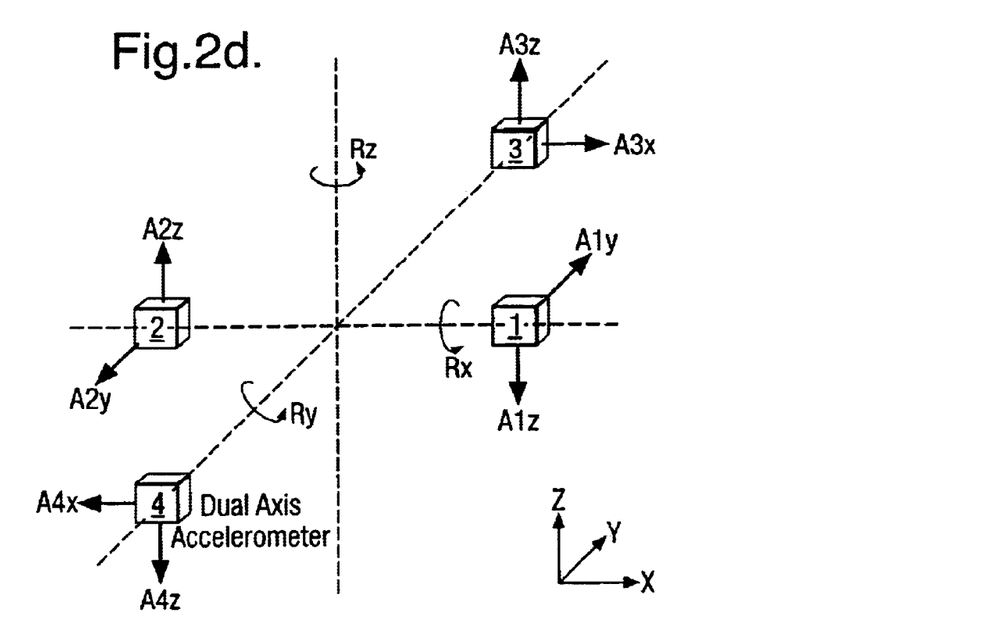
Figure 2E:
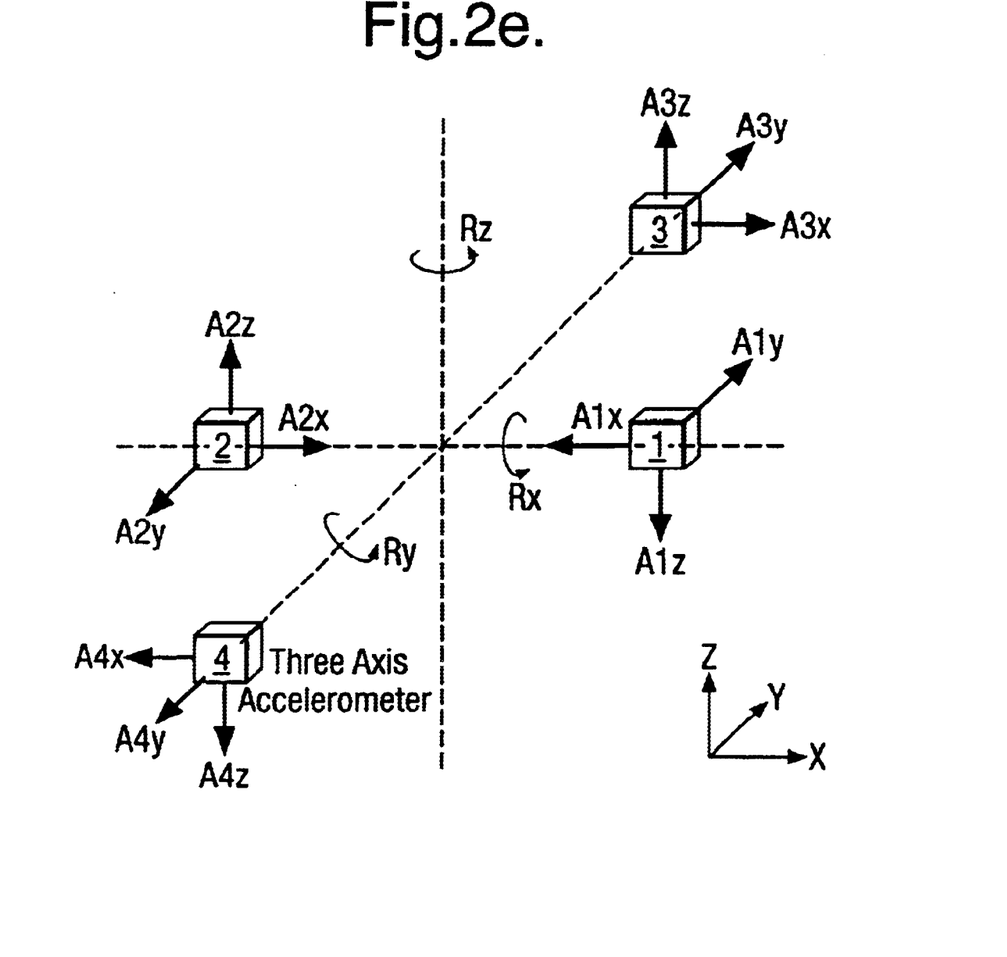

Currently available accelerometers measure acceleration in either one, two or three axes. There are many different permutations for placing these sensors depending on their type and measurement axis. The simplest method of measuring acceleration on the probe head in three orthogonal axes is with a 3-axis accelerometer (or 3 single axis accelerometers), shown in FIG. 2a. Rotation about each of the three orthogonal axes can either be measured using gyroscopes or additional accelerometers, FIG. 2b shows a configuration using 3 gyroscopes and a 3-axis accelerometer. Configurations using single, dual and three axes accelerometers to measure both translation and rotation are shown in FIGS. 2c, 2d, & 2e, six degrees of movement (3 translation and 3 rotation) is derived by combining the measurements from different sensors.

Equations for a six single axis accelerometers configuration (FIG. 2c) are:

$$A_x = \frac{A_{z1} - A_{z2}}{2}$$

$$A_y = \frac{A_{x1} - A_{x2}}{2}$$

$$A_z = \frac{A_{y1} - A_{y2}}{2}$$

$$R_x = \frac{A_{y1} + A_{y2}}{2r}$$

$$R_y = \frac{A_{z1} + A_{z2}}{2r}$$

$$R_z = \frac{A_{x1} + A_{x2}}{2r}$$

Equations for a four dual axis accelerometers configuration (FIG. 2d) are:

$$A_x = \frac{A_{3x} - A_{4x}}{2}$$

$$A_y = \frac{A_{1y} - A_{2y}}{2}$$

$$A_z = \frac{A_{3z} - A_{4z} + A_{2z} - A_{1z}}{4}$$

$$R_x = \frac{A_{3z} + A_{4z}}{2r}$$

$$R_y = \frac{A_{1z} + A_{2z}}{2r}$$

$$R_z = \frac{A_{1y} + A_{2y}}{2r}$$

Equations for a four 3-axis accelerometers configuration (FIG. 2e) are:

$$A_x = \frac{A_{3x} - A_{4x} + A_{2x} - A_{1x}}{4}$$

$$A_y = \frac{A_{1y} - A_{2y} + A_{3y} - A_{4y}}{4}$$

$$A_z = \frac{A_{3z} - A_{4z} + A_{2z} - A_{1z}}{4}$$

$$R_x = \frac{A_{3z} + A_{4z}}{2r}$$

$$R_y = \frac{A_{1z} + A_{2z}}{2r}$$

$$R_z = \frac{A_{1y} + A_{2y} - A_{4x} - A_{3x}}{4r}$$

where
- r denotes the distance of the accelerometer from the axis of rotation
- Rx, Ry, Rz denotes angular rotation about the x,y & z axis respectively
- Ax, Ay, Az denotes acceleration in the x,y & z axis respectively Calibrating the Accelerometers Accelerometer measurements need to be corrected for error in scaling, parallelism between the CMM and accelerometer measurement axis, and transverse sensitivity errors generated within a multi-axis accelerometer unit. A method proposed for calibrating the accelerometer data is by moving one CMM axis at a time with a pre-determined low frequency sinusoidal position demand, where the scales and probe head are rigidly coupled. An ideal 3-axis accelerometer on a perfectly orthogonal CMM will only sense movement in one axis, however in practice, it is likely that the sensor will sense movement in all 3 axes due to reasons stated above. Acceleration measurements of the probe head in 3 axes and scale measurements are stored, and then post-processed to determine the magnitude and phase of the displacement at the probe head due to a known position demand in a particular CMM axis.

The steps required for processing the stored accelerometer measurement data consists of first, integrating twice over time to derive probe head displacement. The result will be a sinusoidal displacement for each probe head axis, the magnitude and phase of the sinusoidal displacement of each probe head axis can be calculated using a number of techniques (e.g. a Fast Fourier Transform algorithm). The magnitude of the probe head displacement then needs to be normalised so as to produce data with the same scaling (measurement units) as the CMM scales. The phase of the displacement at the probe head is used to determine the polarity of the scaling factor (e.g. a 180° phase shift would incur a negative scaling factor). Using this method a calibration matrix for scaling displacement derived from the accelerometers is obtained.

A 3-by-3 matrix (A) is first obtained by deriving the normalised displacement magnitude and phase shift in all 3 axes of the probe head when moving each CMM axis individually.

$$A = \begin{pmatrix} A_{xx} & A_{xy} & A_{xz} \\ A_{yx} & A_{yy} & A_{yz} \\ A_{zx} & A_{zy} & A_{zz} \end{pmatrix}$$

where

Axx denotes the measured normalised displacement of the probe head in the X-axis due to a CMM X-axis position demand Axy denotes the measured normalised displacement of the probe head in the Y-axis due to a CMM X-axis position demand Axz denotes the measured normalised displacement of the probe head in the Z-axis due to a CMM X-axis position demand Ayx denotes the measured normalised displacement of the probe head in the X-axis due to a CMM Y-axis position demand Ayy denotes the measured normalised displacement of the probe head in the Y-axis due to a CMM Y-axis position demand Ayz denotes the measured normalised displacement of the probe head in the Z-axis due to a CMM Y-axis position demand Azx denotes the measured normalised displacement of the probe head in the X-axis due to a CMM Z-axis position demand Azy denotes the measured normalised displacement of the probe head in the Y-axis due to a CMM Z-axis position demand Azz denotes the measured normalised displacement of the probe head in the Z-axis due to a CMM Z-axis position demand The accelerometer displacement scaling matrix (S) that converts measured displacement from the accelerometer to actual displacement is obtained by inversing matrix A.

$$S = A^{-1}$$

The sensors used to detect angular acceleration need to be calibrated before the probe head is mounted onto a CMM. One method of calibrating the accelerometer configurations shown in FIGS. 2c, 2d & 2e is by rotating the probe head with a constant sinusoidal angular acceleration and measuring the angular acceleration about that axis. The measured angular acceleration is then compared with measurements taken simultaneously with a primary angular acceleration sensor to determine the scaling factor required for converting measurements obtained from the accelerometers in the probe head into angular acceleration units. A similar method can also be used to calibrate the probe head translational sensing accelerometers.

Data Fusion Algorithm Using Complementary Filters

Figure 3A:
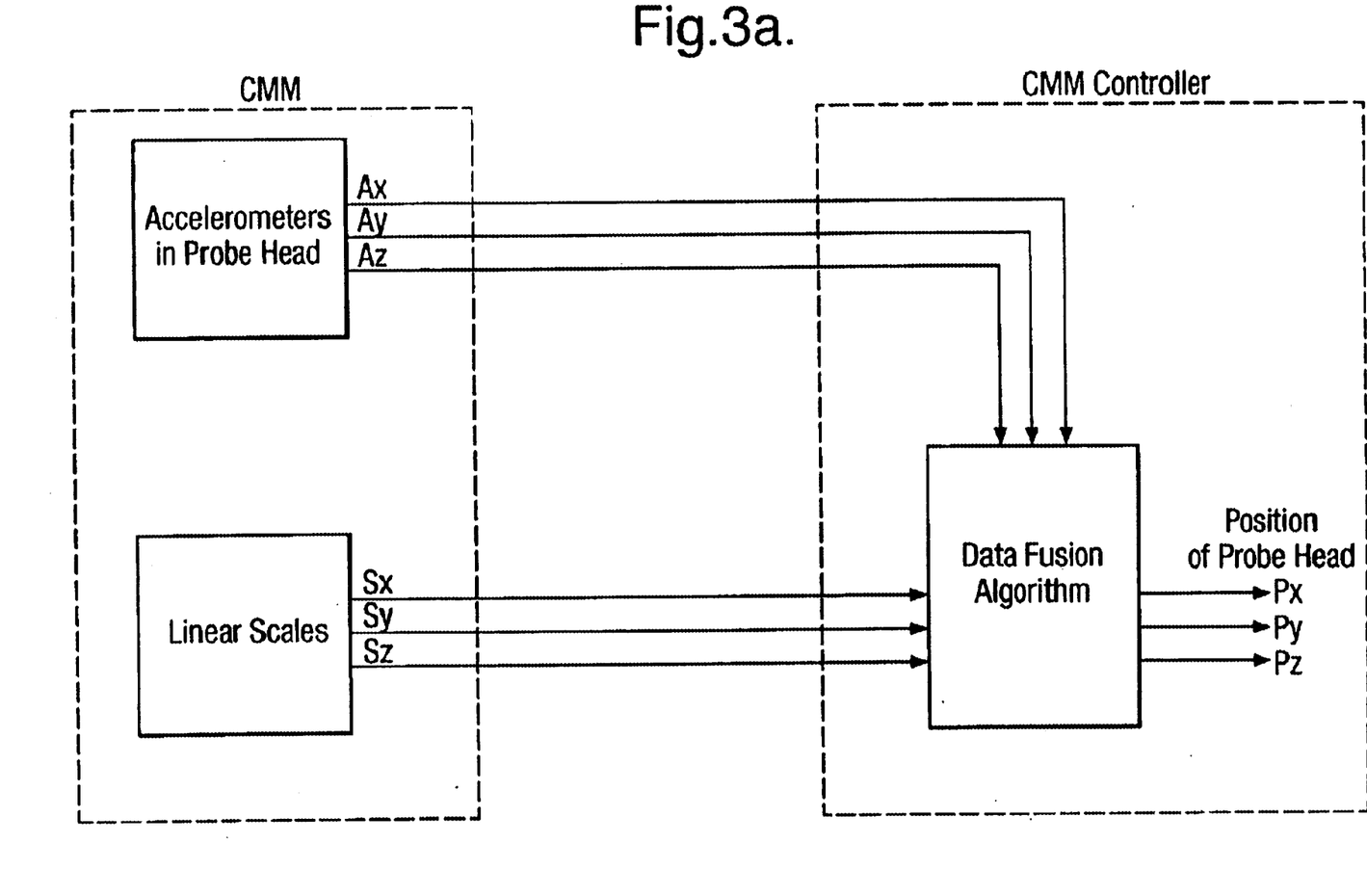
FIGS. 3A–3B are diagrams illustrating an exemplary data fusion algorithm.
Figure 3B:
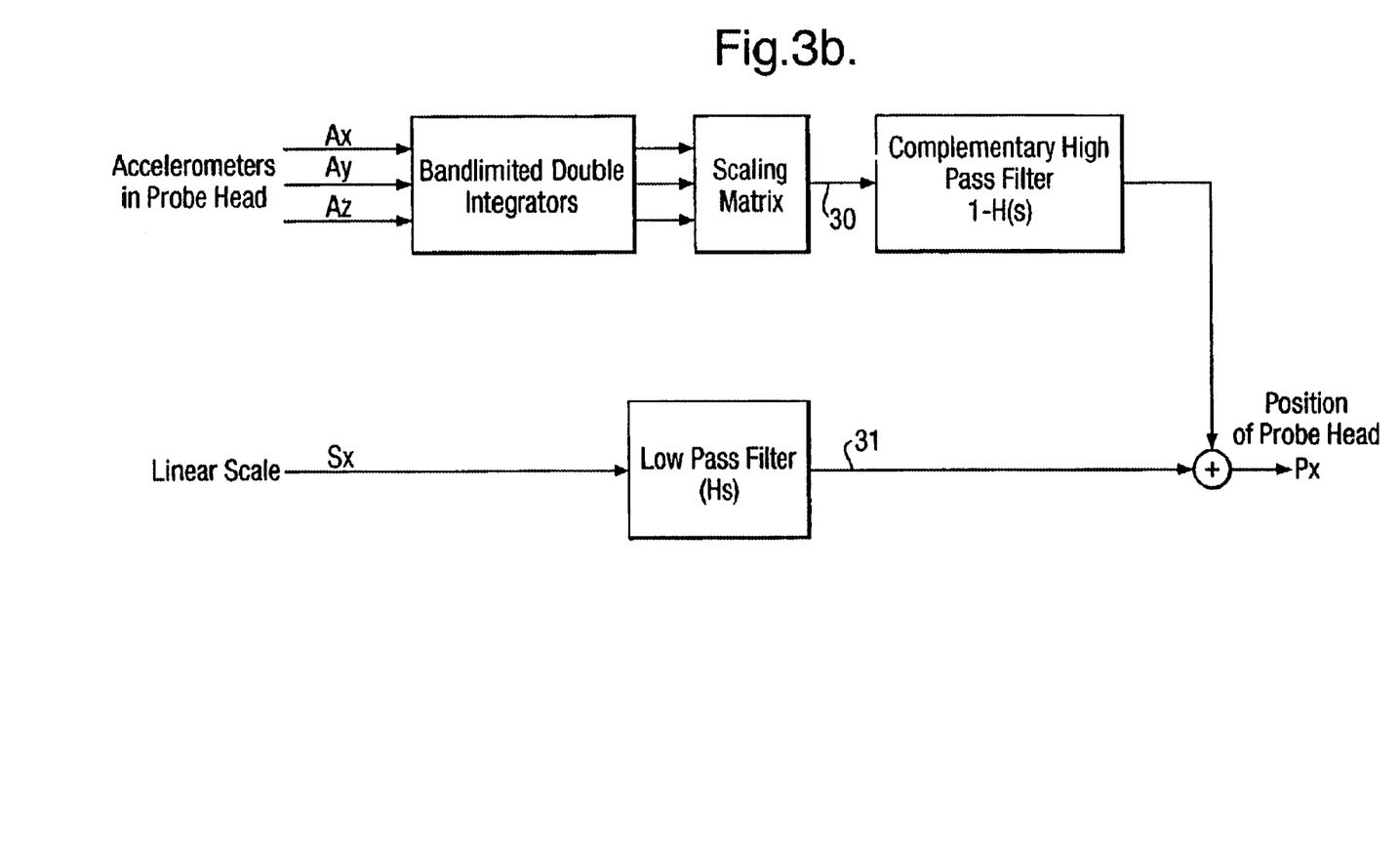

Block diagrams showing this data fusion algorithm are presented in FIGS. 3a & 3b, the algorithm assumes that at low frequencies the measurement scales and the probe head are rigidly coupled together. However, at and above the natural frequency (fn) this is no longer true, the probe head and measurement scales starts to became decoupled.

The data fusion algorithm shown in FIG. 3b for illustration purposes is only for the x-axis. The process is similar for the other 2 axes. The algorithm combines displacement data from the scales with displacement data obtained from acceleration sensors in the probe head with a pair of complementary filters. The signals (Ax, Ay, Az) from the probe head accelerometers are first integrated twice over time via a bandlimited double integrator to obtain displacement, the displacement signal then needs to be normalised and resolved to have the same scaling and direction (x-axis) as the readhead measurement via a scaling matrix. Since signals produced from certain accelerometers are normally prone to offset drift caused by change in temperature and other external factors, the integrator is frequency bandwidth limited to remove low frequencies and offset signals. The derived x-axis displacement information of the probe head (30) is then filtered with a high pass filter (this filter is the complement of the low pass filter) and then added to the low pass filtered information from the scales (31). The result (Px) is an estimate of the position of the probe head due to the presence of structural vibrations that is undetectable by the measurement scales.

Data Fusion Algorithm Using Two Accelerometers Per Axis in Differential Mode

Figure 4A:
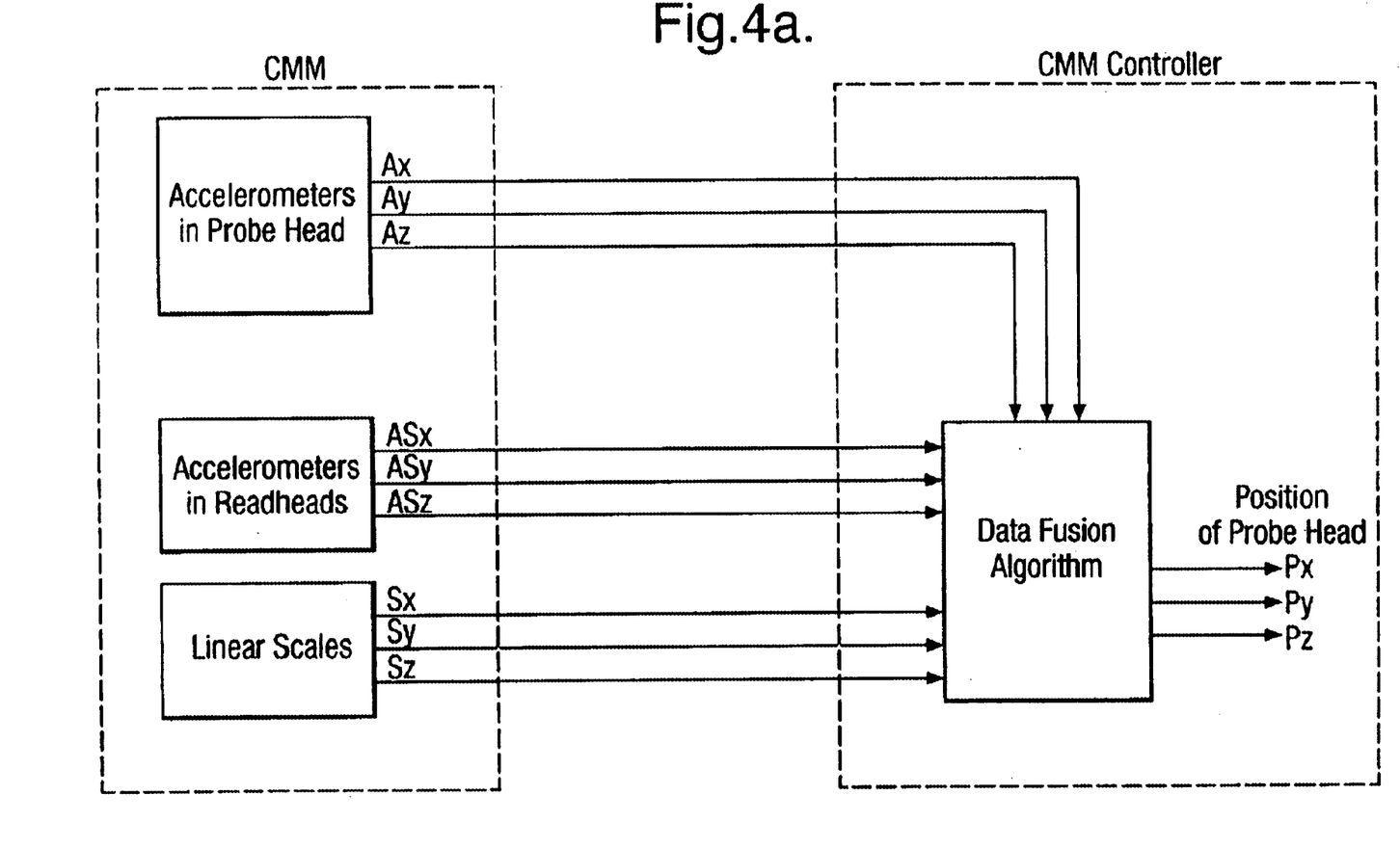
FIGS. 4A–4B arc diagrams illustrate an exemplary method using two accelerometers on each CMN axis.
Figure 4B:
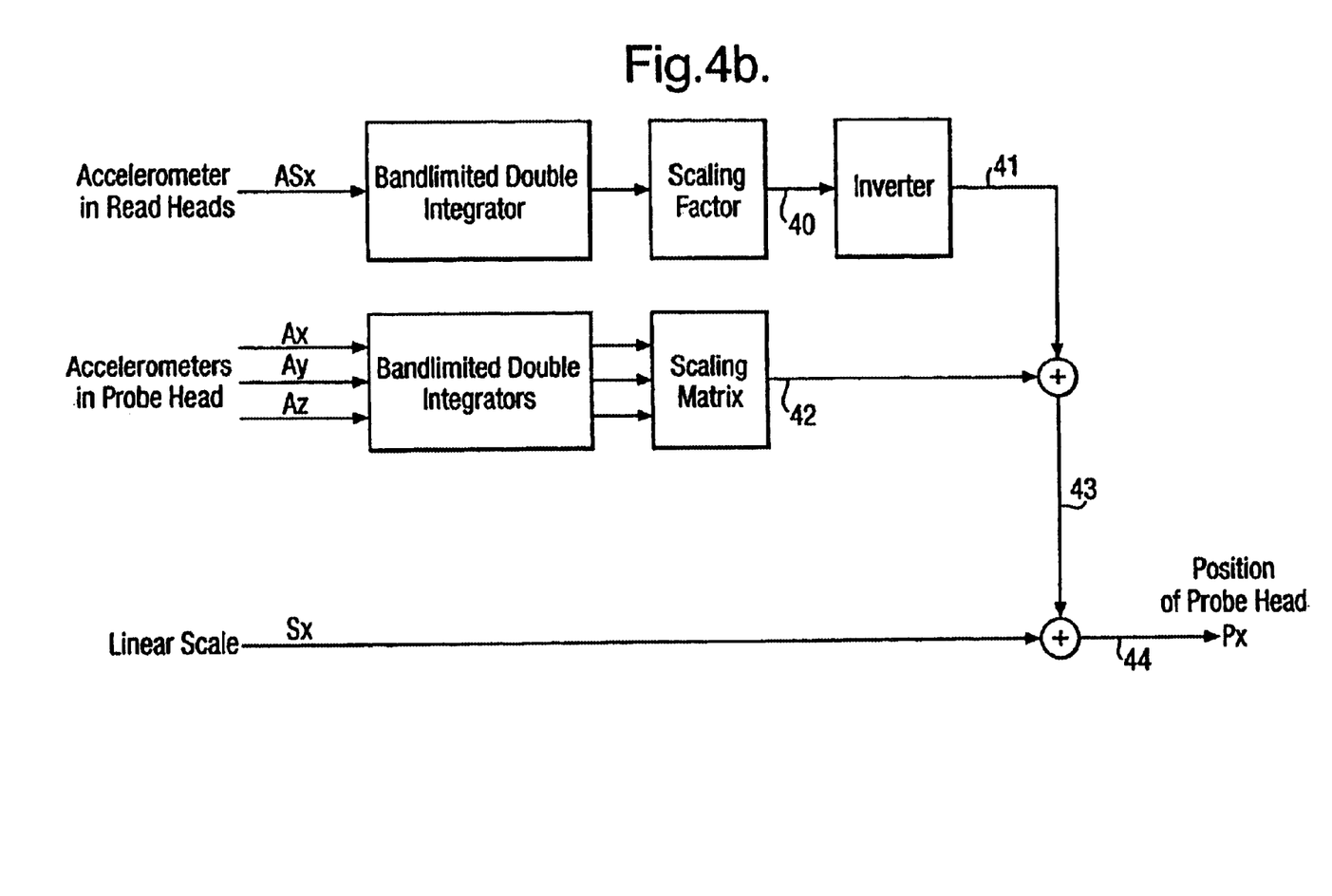

FIGS. 4a & 4b present block diagrams showing a method using 2 accelerometers on each CMM axis to determine the displacement of the probe head from its nominal centre. The extra accelerometer should ideally be mounted within or near the readhead for the linear scale, however, anywhere else that is rigidly coupled to the axis readhead will suffice. This accelerometer needs only to measure acceleration in the axis of the linear scale, thus 3 single axis accelerometers (one in each readhead) will suffice.

The data fusion algorithm shown in FIG. 4b for illustration purposes is only for the x-axis. The process is similar for the other 2 axes. The signal from the x-axis readhead accelerometer (ASx) is first integrated twice over time via a bandlimited double integrator to obtain displacement, the displacement signal then needs to be normalised to have the same scaling as the readhead measurements via a scaling factor. This process produces a signal (40) representing high frequency displacement information at the x-axis readhead. The signals (Ax, Ay, Az) from the probe head accelerometers are processed in a similar manner to obtain x-axis probe head displacement information (42). X-axis probe head displacement (42) is then added to the inverted x-axis readhead displacement (41), this process produces a signal (43) representing the displacement of the probe head in the x-axis that is not detectable by the readheads. This signal (43) is then added to the x-axis linear scale measurement (Sx) to obtain the instantaneous x-axis coordinate of the probe head (Px).

Figure 5A:
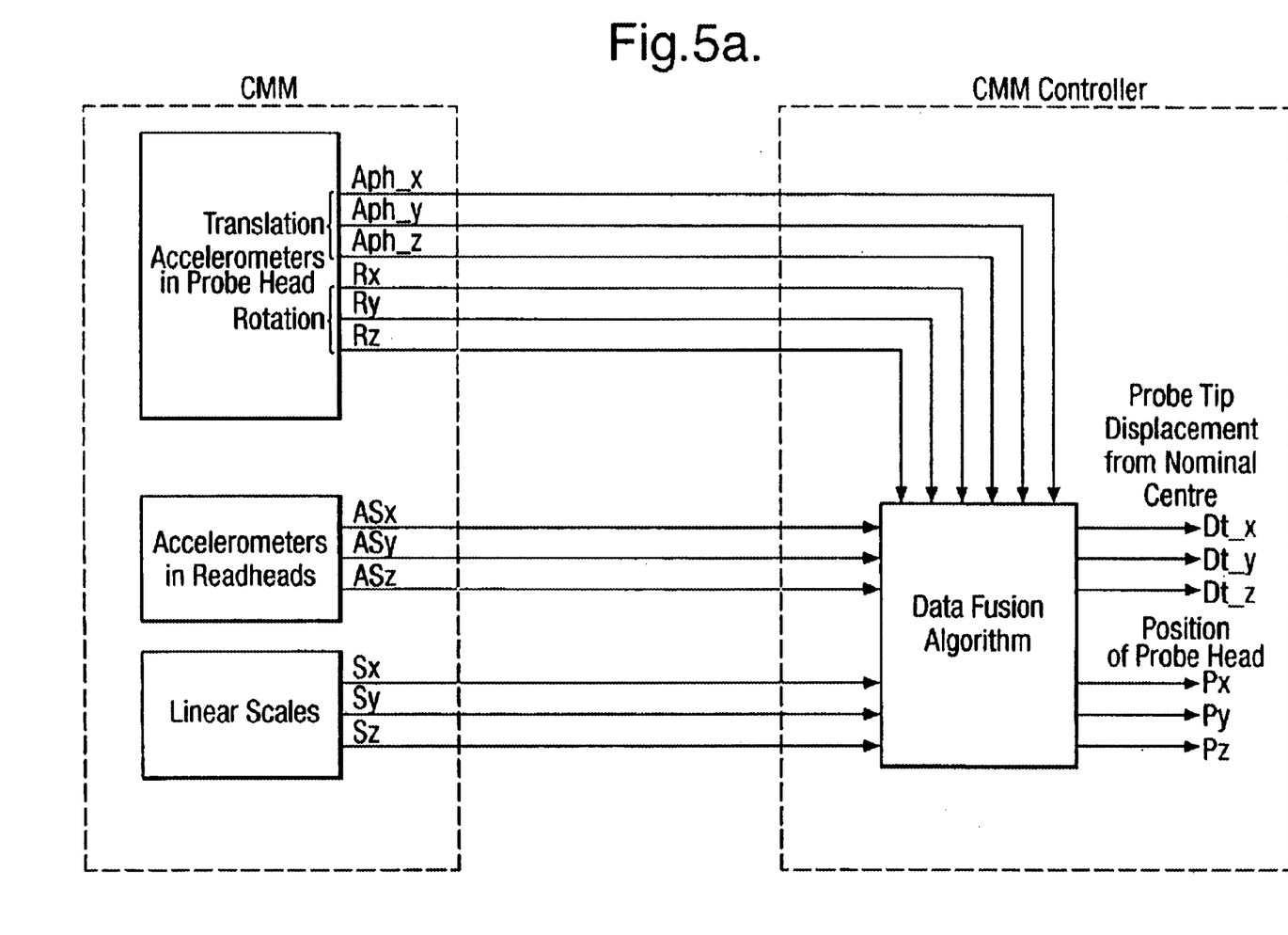
FIGS. 5A–5B are diagrams that illustrate an exemplary method of using acceleration sensors to measure a displacement of a probe head from its nominal center.
Figure 5B:
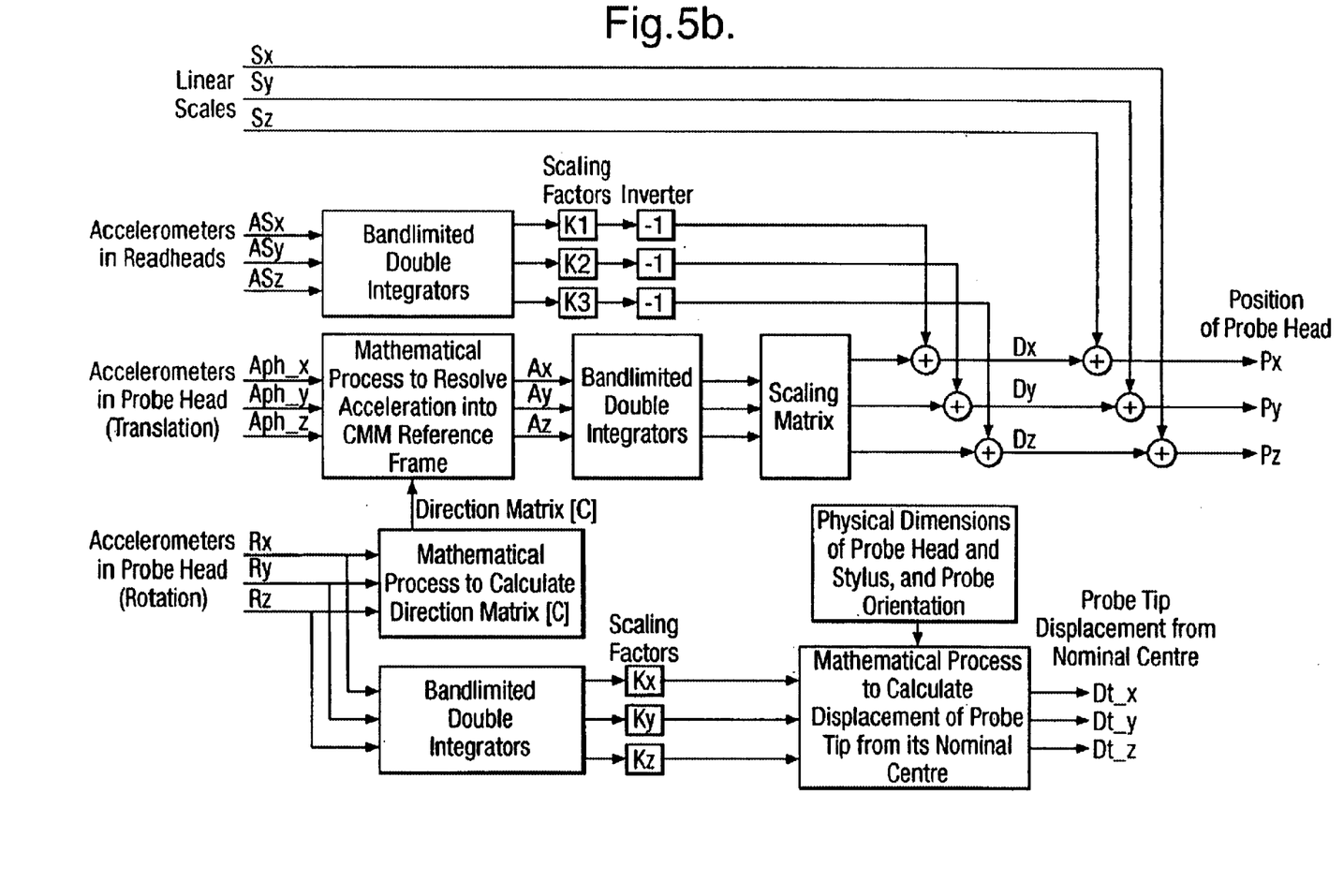

Data Fusion Algorithm for Rotational and Translational Displacement of a Probe Head FIGS. 5a & 5b shows a strategy using acceleration sensors to measure displacement of the probe head from its nominal centre in 3 translation and 3 rotational axes. The data fusion algorithm uses this information together with position and acceleration information from the linear scales to determine the position of the probe head and probe tip. Angular rotation information is first used to determine a 3-by-3 direction matrix [C], the direction matrix is then used to transform the translational acceleration information at the probe head (Aph_x, Aph_y, Aph_z) into the CMM axis system (Ax, Ay, Az). The acceleration components in the CMM axis system is double integrated and scaled, and then added to the respective acceleration at the readheads. The result is the translational displacement of the probe head from its nominal centre (Dx, Dy, Dz). This information is then added to the position information from the linear scales to give the absolute position of the probe head.

The displacement of the probe tip from its nominal position is determined by double integrating and scaling the angular acceleration information, this would provide rotational displacement information of the probe head. Knowing the physical dimensions of the probe head, i.e. the distance between the probe tip and centre of accelerometer axis, and the orientation of the probe stylus. The displacement of the probe tip from its nominal centre can be calculated. Finally, the measurement point is obtained by adding displacement of the probe tip from its nominal centre to the absolute position of the probe head.

Figure 6A:
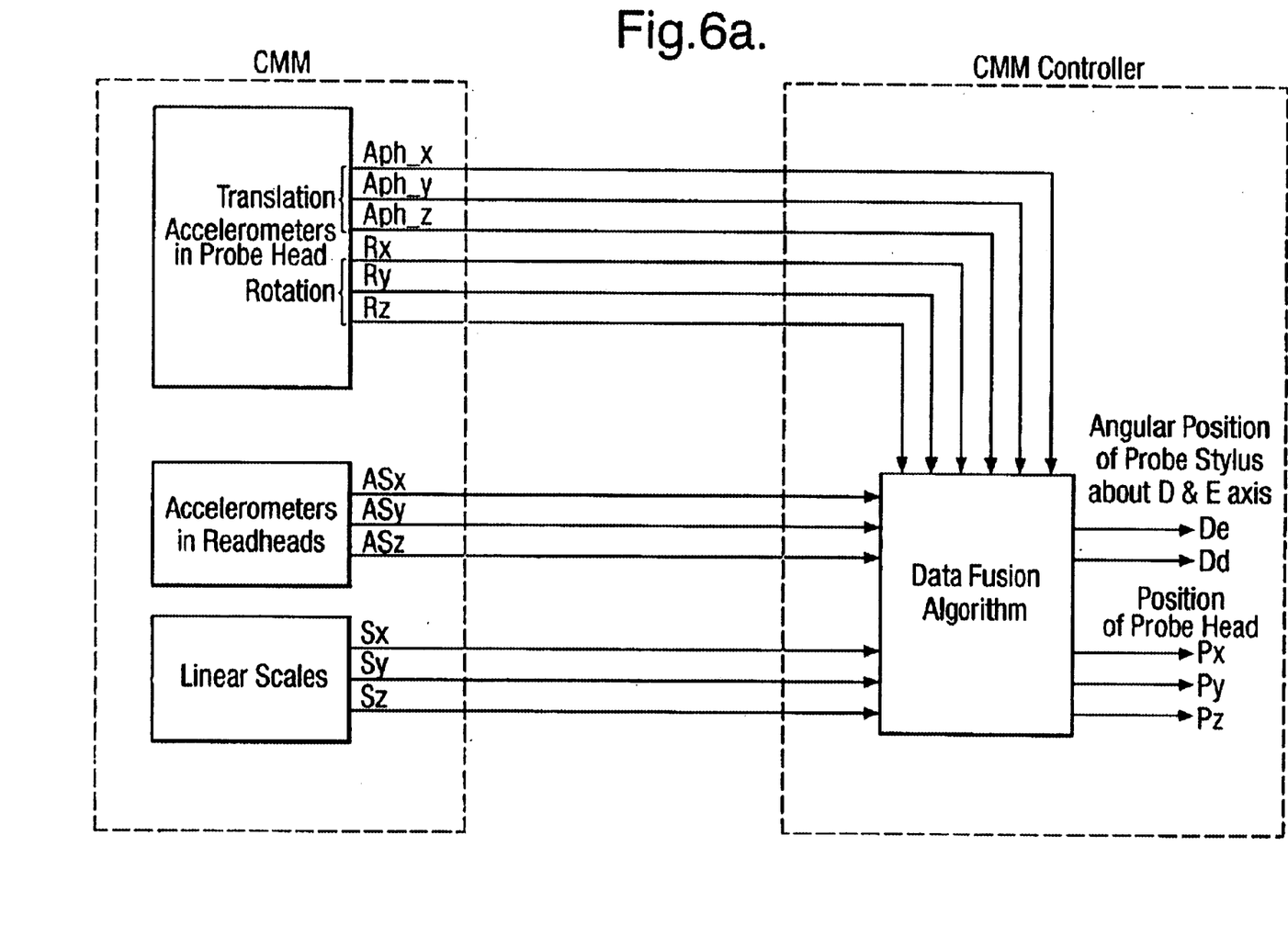
FIGS. 6A–6B illustrate an exemplary method for correcting measurements due to probe head displacement and rotation from its nominal center.
Figure 6B:
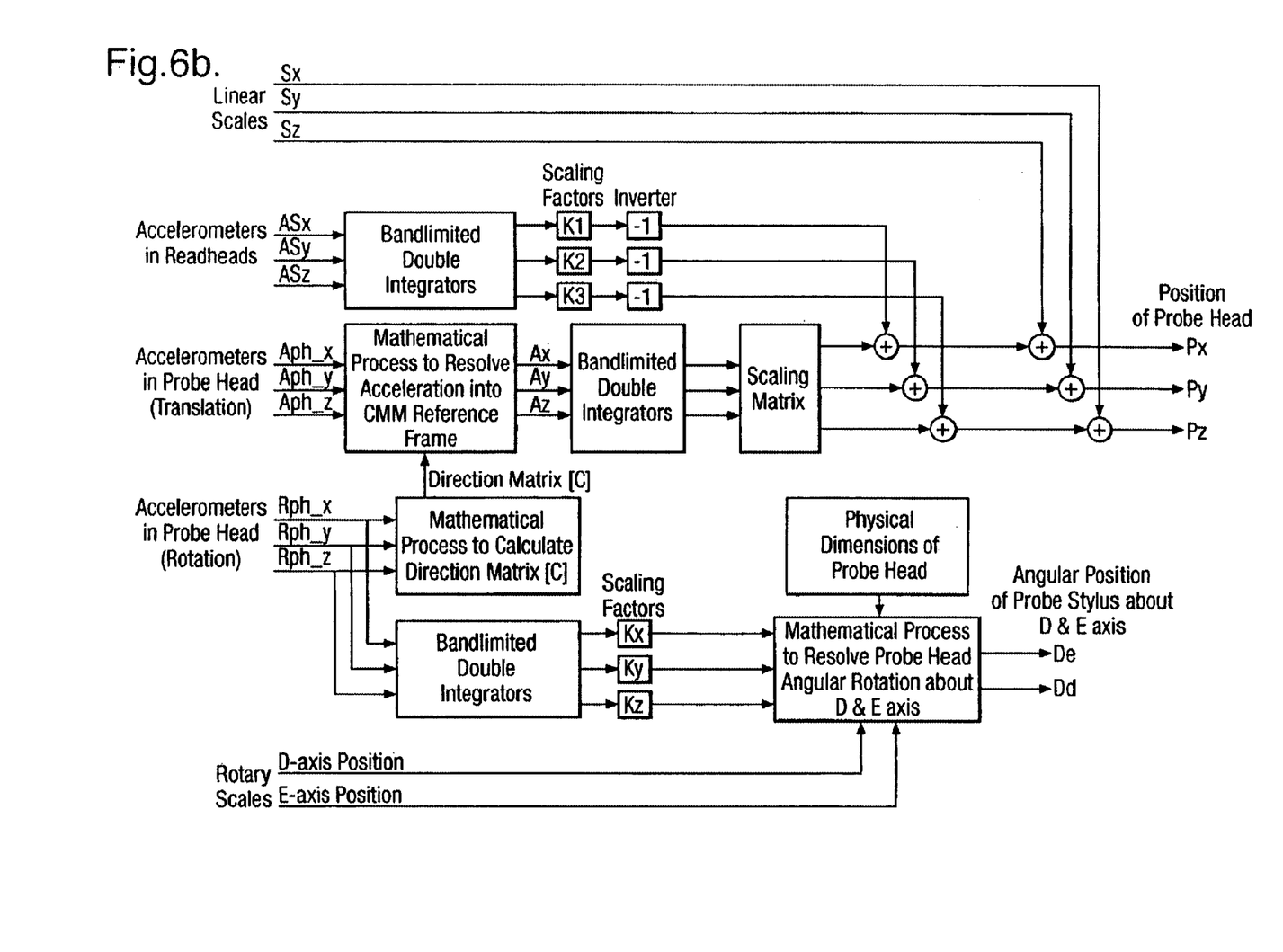

Data Fusion Algorithm for Rotational Displacement of a Motorised Servo Positioning Probe Head FIGS. 6a & 6b shows a method for correcting measurements due to probe head displacement and rotation from its nominal centre. This strategy is specific to catering for torque generated by a servo positioning motorised probe head that is taking measurements when the probe head is under motion control. This strategy is similar to that described in Section 5.6 except that the orientation of the probe tip can be continuously changing and needs to be taken into consideration when calculating the true position of the probe tip. Position information from the rotary encoder needs to be corrected for any rotation displacement at the probe head generated by the motoring torques. This is achieved by using rotational displacement information obtained from the angular accelerometers and using this information to correct the position information from the rotary encoders. This data fusion algorithm provides the instantaneous absolute position of the motorised probe head (Px, Py & Pz), together with the corrected angular position of the probe stylus from the rotary encoders (De and Dd). The relative position of the probe tip to the centre of the probe head is calculated from the rotary encoder information (De & Dd). The true position of the probe tip is then calculated by adding the relative position of the probe tip to the absolute position of the probe head (Px, Py, Pz).

Background Information on Acclerometers

The accelerometers may be operated in either open or closed loop configurations. The closed loop configuration uses force feedback re-balancing of the proof mass to improve the quality of the acceleration signal. This configuration is normally used in highly accurate inertial navigation systems that requires high sensitivity and at the same time cannot tolerate errors in offset bias (drift) and linearity. However, these accelerometers are expensive.

Open loop configuration accelerometers have the undesirable characteristics of being sensitive to supply voltage variation, non-linearity of the output, and high thermal coefficients of bias and scale factor. These undesirable characteristics can be minimised to an extent with the use of additional electronic circuits. However, the performance will not approach that of a closed loop accelerometer. The main advantage of open loop accelerometers is their low cost.

What is claimed is:

1. A method of correcting coordinate measurement errors produced by dynamic forces distorting moving parts of a machine, the method comprising:
   measuring acceleration values of a moving part of the machine;
   using position measuring devices of the machine to obtain first signals indicative of a displacement of the moving part; and
   applying a data fusion algorithm to obtain corrected values for a measured displacement of the moving part, wherein the data fusion algorithm double integrates the measured acceleration values to produce second signals indicative of a distortion from a nominal position of the moving part due to accelerations and combines the second signals with the first signals.

2. A method according to claim 1, wherein the acceleration values of said moving part are measured along a linear axis of the machine.

3. A method according to claim 1, wherein the acceleration values of said moving part are angular accelerations.

4. A method according to claim 1, wherein the step of measuring the acceleration values of a moving part of the machine includes measuring the accelerations both of the moving part and of at least one of said position measuring devices along an axis of the machine.

5. A method according to claim 1, wherein the data fusion algorithm includes a scaling step wherein the second signals produced by double integration of the measured acceleration values are processed in a scaling matrix in order to produce data with the same measurement units as those produced by the position measuring devices of the machine.

6. A method according to claim 1, wherein the data fusion algorithm includes a filtering step, wherein the second signals indicative of distortion of the moving part due to accelerations thereof are filtered through a high pass filter machine.

7. A method according claim 1, wherein the data fusion algorithm includes a filtering step, wherein the first signals indicative of the displacement of the moving part produced by the position measuring devices of the machine are filtered through a low pass filter.

8. A method according to claim 1, wherein both linear and angular accelerations of the moving part are measured and the data fusion algorithm processes the angular accelerations of the moving part to calculate a direction matrix which describes the orientation of the axes of the linear accelerometers relative to the linear axes of the machine.

9. A method according to claim 1 wherein, the moving part of the machine comprises a measuring probe carried by the machine.

10. A method according to claim 1 wherein, the moving part of the machine comprises a probe head carried by the machine and to which a measuring probe is connected.

11. A method according to claim 4, wherein the data fusion algorithm includes the step of double integrating the difference between accelerations of the moving part and of the position measuring device in the direction of said axis.

12. A data fusion algorithm for correcting measurement errors produced by position measuring devices on a movable machine part comprising:

(a) inputting a first signal which is indicative of the accelerations of a moving part of a machine;

(b) integrating the first signal twice to obtain a displacement signal indicative of displacement of the moving part caused by acceleration effects of a movement;

(c) normalizing and resolving the doubly integrated first signal;

(d) inputting a second signal from position measuring devices of a machine which is indicative of a displacement of the movable machine part caused by the movement;

(e) adding the normalized and resolved first signal to the second signal to produce a corrected position signal.

13. A data fusion algorithm according to claim 12 including a filtering step wherein the signals indicative of the displacement of the moving part of the machine due to the accelerations thereof are filtered through a high pass filter prior to being added to the second signal.

14. A data fusion algorithm according to claim 13 comprising:

inputting a third signal which is indicative of the accelerations of the position measuring device;

integrating the third signal twice to obtain a displacement signal indicative of displacement of the position measuring device caused by acceleration effects of a movement;

normalizing and resolving the third signal;

inverting the normalized and resolved third signal; and adding the inverted third signal to the normalized and resolved first signal.

15. A data fusion algorithm according to claim 12 including:

inputting a third signal which is indicative of the accelerations of the position measuring device; and subtracting the third signal from the first signal prior to integrating the first signal twice.

16. A data fusion algorithm according to claim 12 comprising:

inputting a fourth signal indicative of angular accelerations of the moving part caused by acceleration effects of a movement;

creating a direction matrix which describes the orientation of the moving part with respect to an axis of the machine;

applying the direction matrix between steps (a) and (b) to transform translational acceleration information of the moving part into the linear axes of the machine.

17. A data fusion algorithm according to claim 16 wherein the fourth signal is additionally integrated twice and scaled to give a signal indicative of displacement of the moving part from a nominal center.

18. A data fusion algorithm according to claim 17 comprising:

inputting a fifth signal indicative of angular acceleration of the moving part caused by internal torque;

integrating the fifth signal twice to obtain a rotational displacement signal indicative of the displacement of the moving part caused by internal torque during a movement;

adding the doubly integrated fifth signal to the fourth signal.

19. A coordinate measuring machine controller programmed to run a data fusion algorithm according to claim 12.

20. A program for a coordinate measuring machine controller which operates in accordance with a data fusion algorithm according to claim 12.

* * * * *